United States Patent [19]

Nakamura et al.

[11] Patent Number: 5,010,717
[45] Date of Patent: Apr. 30, 1991

[54] OSCILLATING-TYPE MOWING APPARATUS

[75] Inventors: Masaharu Nakamura; Kazuo Kajimura, both of Tokyo, Japan

[73] Assignee: Komatsu Zenoah Company, Tokyo, Japan

[21] Appl. No.: 498,631

[22] Filed: Mar. 26, 1990

[30] Foreign Application Priority Data

Mar. 27, 1989 [JP] Japan .................................. 1-71854
Jun. 2, 1989 [JP] Japan .............................. 1-64005[U]

[51] Int. Cl.⁵ ...................... A01D 34/30; A01D 34/84
[52] U.S. Cl. .................................... 56/17.6; 56/255; 56/295; 74/52
[58] Field of Search ...................... 56/10.3, 17.6, 240, 56/246, 247, 248, 255, 293, 295, DIG. 6; 475/331, 332; 74/22 R, 52; 30/276

[56] References Cited

U.S. PATENT DOCUMENTS

| | | |
|---|---|---|
| 1,110,058 | 9/1914 | Hurley . |
| 2,119,683 | 5/1936 | Nevraumont . |
| 2,976,655 | 7/1959 | Speckman . |
| 3,472,007 | 8/1967 | Green . |
| 3,583,690 | 3/1967 | Hinks et al. . |
| 3,618,304 | 7/1970 | Hundhausen . |
| 3,631,658 | 1/1972 | Green ........................... 56/246 X |
| 3,701,238 | 10/1972 | Hintze, Jr. . |
| 3,740,936 | 6/1973 | Berger . |
| 3,857,177 | 12/1974 | Karubian et al. . |
| 4,196,566 | 4/1980 | Donnelley . |
| 4,310,999 | 1/1982 | Onoue . |
| 4,361,056 | 11/1982 | George ........................... 74/52 X |
| 4,451,983 | 6/1984 | Johnson et al. . |
| 4,813,291 | 3/1989 | Schumacher, II et al. ............ 74/52 |
| 4,848,846 | 7/1989 | Yamada et al. . |
| 4,881,363 | 11/1989 | Terai et al. ............................ 56/255 |

FOREIGN PATENT DOCUMENTS

| | | |
|---|---|---|
| 28443 | 4/1970 | Australia . |
| 476883 | 9/1976 | Australia . |
| 522302 | 11/1977 | Australia . |
| 68701 | 3/1981 | Australia . |
| 320330 | 2/1975 | Austria . |
| 117848 | 9/1984 | European Pat. Off. . |
| 257566 | 3/1988 | European Pat. Off. . |
| 337428 | 10/1989 | European Pat. Off. . |
| 2058984 | 6/1972 | Fed. Rep. of Germany . |
| 3812272 | 11/1988 | Fed. Rep. of Germany . |
| 2357162 | 6/1977 | France . |
| 516273 | 1/1972 | Switzerland . |
| 2199226 | 7/1988 | United Kingdom . |
| 89/09538 | 10/1989 | World Int. Prop. O. . |

Primary Examiner—William P. Neuder
Attorney, Agent, or Firm—Sandler, Greenblum & Bernstein

[57] ABSTRACT

A mowing apparatus has a motive power source for supplying rotating motion; a pair of first and second cutting disks slidably supported with each other, each of the disks including a plurality of peripheral cutting teeth; mechanism for reciprocatively oscillating the first and second cutting disks oppositely with each other within a predetermined oscillating range; and mechanism for rotating the first and second cutting disks while the first and second cutting disks are oscillated reciprocatively by the reciprocatively oscillating mechanism.

8 Claims, 3 Drawing Sheets

OSCILLATING-TYPE MOWING APPARATUS

BACKGROUND OF THE INVENTION

1. Field of the Invention

The present invention relates to a mowing apparatus with two oscillating cutting disks.

2. Description of the Prior Art

One example of an oscillating mowing apparatus is illustrated in European Patent Application No. 87112105.9. Two superposed cutting disks are used in the mowing apparatus of that patent application. The two cutting disks oscillate reciprocatively in opposite directions within a predetermined oscillating range. This apparatus provides high cutting performance with superior operation at a high level of safety. However, in this type of manually-operated or power-driven vehicular-type mowing apparatus provided with two oscillating cutting disks, there is a tendency for only the cutting teeth positioned on the side of the cutting disks in the direction of advance to be fully utilized. In particular, in an edger provided on the side portion of its body with such cutting disks perpendicular to the ground and parallel to the advance of the machine, there is a tendency for only the teeth on the lower side of the peripheral portion of the cutting disks to be fully utilized. This gives rise to the problem of decreased life expectancy for the apparatus. In this case, consideration has been given to change the mounting position of the cutting disks with respect to the body of the machine. However, the operation of changing the mounting position is very troublesome so this approach is therefore not desirable.

In addition, the resistance caused by the grass and the like which is to be cut by the mowing machine acts to hinder the advance of the device. Operating difficulties therefore frequently occur in both manually-operated and power-driven machines. This is another problem.

SUMMARY OF THE INVENTION

A first object of the present invention is to provide, with due consideration to the drawbacks of such conventional machines, a mowing machine with two oscillating cutting disks wherein no deviation occurs at a specific section in the utilized portion of the cutting disks.

A second object of the present invention is to provide a mowing machine with two oscillating cutting disks wherein vehicular machines of both the manually-operated and power-driven types can be advanced with ease.

These objects are achieved in the present invention by the provision of a mowing machine comprising (1) a motive power source for supplying rotation motion; (2) a pair of first and second cutting disks slidably supported with each other, each of the disks including a plurality of peripheral cutting teeth; (3) means for reciprocatively oscillating the first and second cutting disks oppositely with each other within a predetermined oscillating range; and (4) means for rotating the first and second cutting disks while the first and second cutting disks are oscillated reciprocatively by the reciprocatively oscillating means.

As a result, while the two cutting disks are oscillating reciprocatively in relatively opposite directions, the two cutting disks are rotating at a predetermined velocity in a fixed direction so that the wear on the teeth is completely uniform. In addition, the necessary power for advancing the device is reduced by the force produced by the rotation of the cutting disks, particularly in the case where the oscillating cutting disks are provided almost perpendicular to the ground on a side section of a manually-operated or power-driven vehicular-type of edger, and parallel to the direction of advance, so that this action is performed with ease.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

A suitable embodiment of a mowing apparatus relating to the present invention will now be explained with reference to the drawings.

Figure 1:
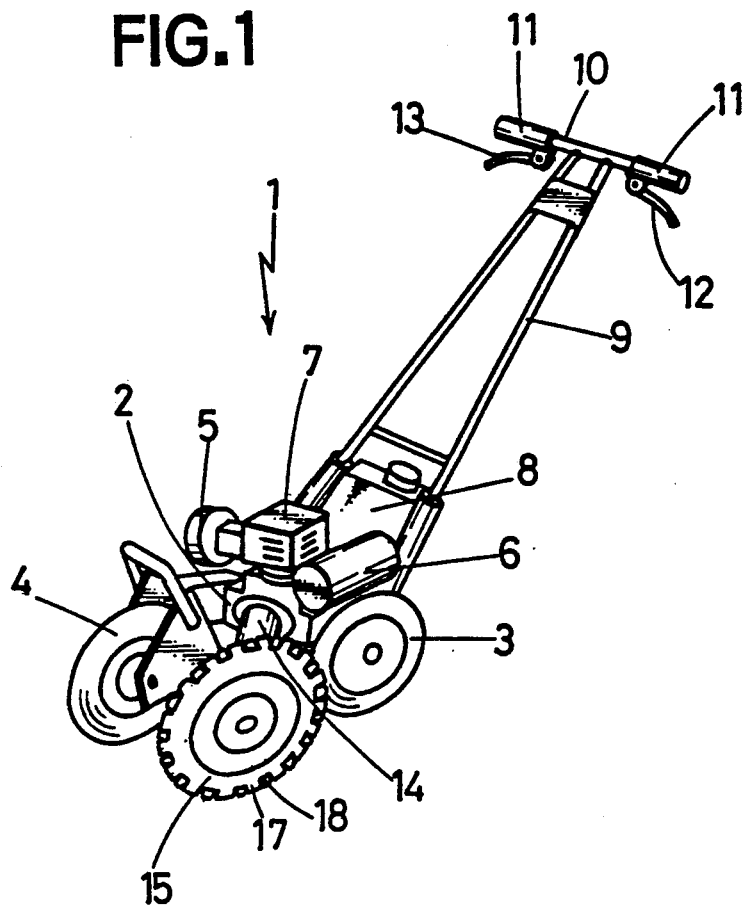
FIG. 1 is a full perspective view showing a mowing apparatus as an embodiment of the present invention.
Figure 2:
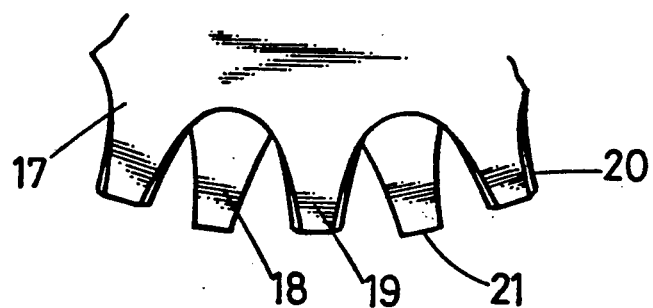
FIG. 2 is a partial plan view of the teeth of a cutting disk used in the mowing apparatus of this embodiment.

Now referring to FIG. 1, a lawn mower 1 is shown as one example of a mowing apparatus. Specifically, a pair of rear wheels 3 and a single front wheel 4 are provided on a body 2 of the lawn mower 1. The height of the front wheel 4 is adjustable with respect to the body 2. In this embodiment of the present invention an engine 7 equipped with an air cleaner 5 and a muffler 6 is provided on the body 2 as the power source. An electric motor may also be used as a drive device in place of the engine 7. A fuel tank 8 is provided on the body 2. On the rear side of the body 2 an upwardly extending steering handle 9 is provided. A pair of grips 11, a throttle lever 12 for the engine 7, and an fitting lever 13 are provided at an upper end 10 of the handle 9. The fitting lever 13 is provided to fit and release the front wheel 4. In this way the height of the front wheel 4 can be adjusted, and therefore the height of the cut is also adjusted. A gear casing 14 is provided on the body 2. A pair of first and second cutting disks 15 and 16, both capable of oscillating, are provided on the gear casing 14 substantially perpendicular to the ground and substantially parallel to the direction of advance of the lawn mower 1, that is, parallel to the rear wheels 3 and the front wheel 4. As shown in FIG. 2, a plurality of cutting teeth 17, 18 is provided, arranged peripherally on the first and second cutting disks 15, 16. Each of the teeth 17, 18 comprises a major surface 19, two side cutting edges 20, and an outer peripheral edge 21. The outer peripheral edge 21 is provided substantially perpendicular to the major surface 19 and does not have a cutting edge. The first and second cutting disks 15, 16 are bent slightly inward toward each other so that the superposed teeth 17, 18 are pressed together only at the tip portion from elastic contact.

Figure 3:
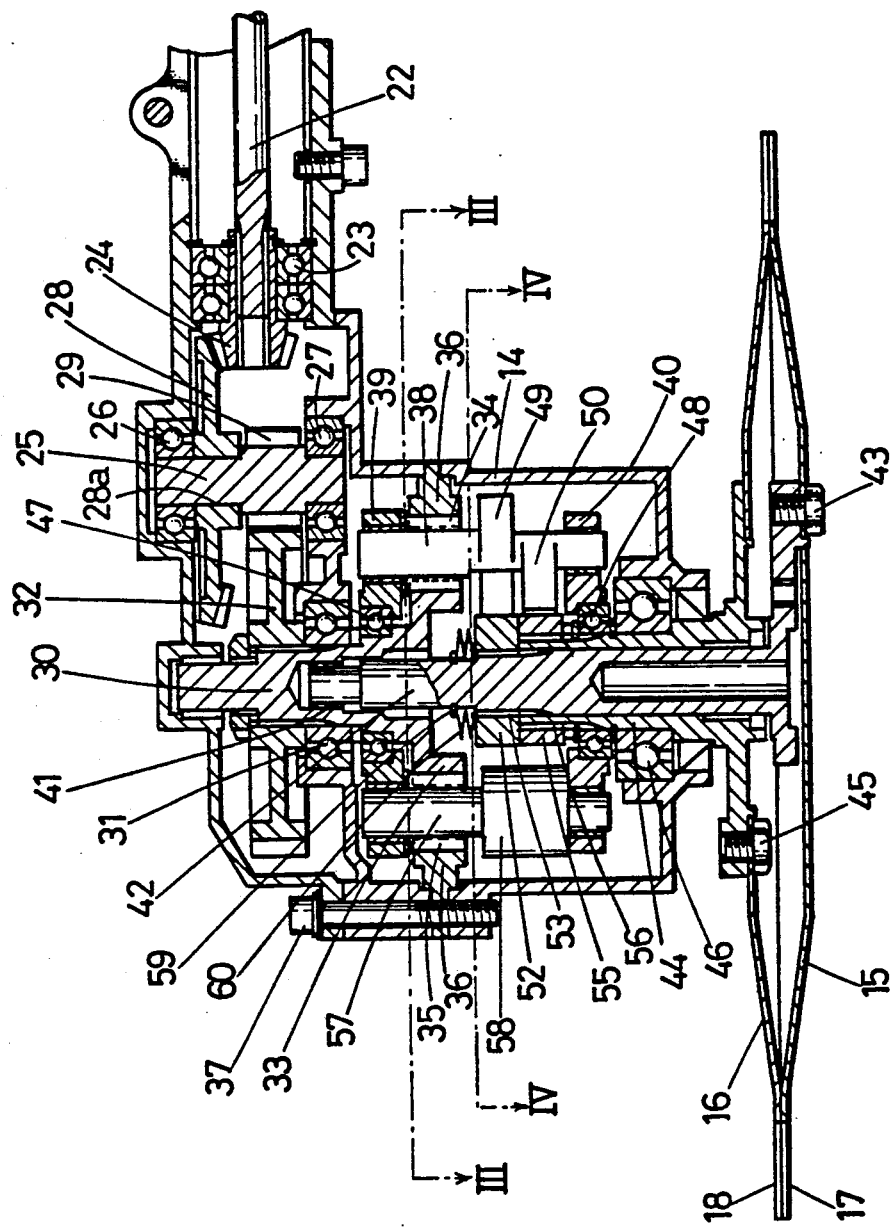
FIG. 3 is a horizontal sectional view of a gear casing of an embodiment of the present invention.
Figure 4:
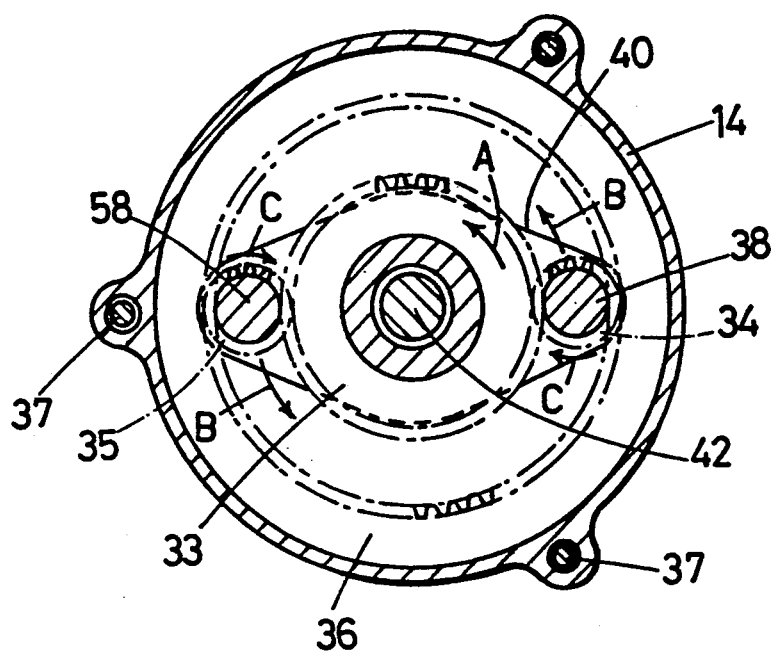
FIG. 4 is a vertical sectional view taken along the line III—III of FIG. 3.
Figure 5:
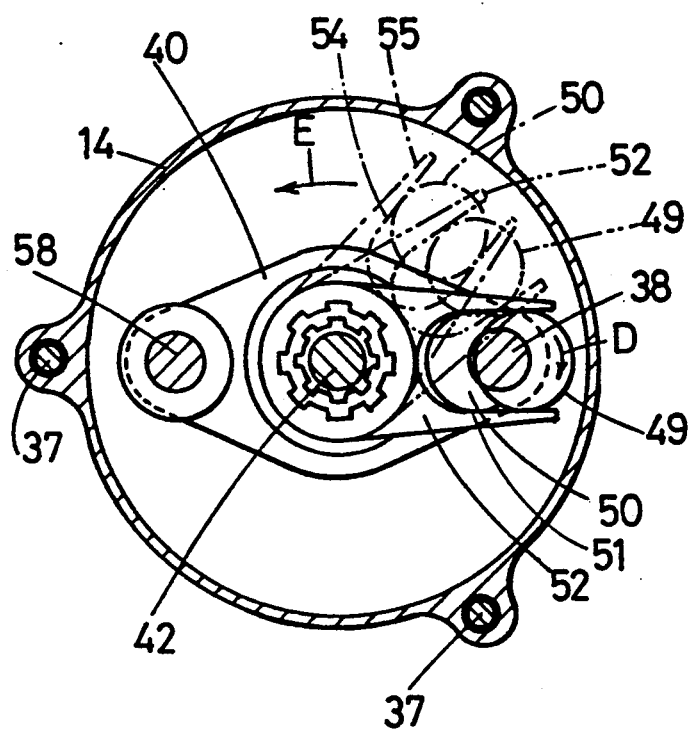
FIG. 5 is a vertical sectional view taken along the line IV—IV of FIG. 3.

FIGS. 3, 4, and 5 show the configuration inside the gear casing 14 in detail. A transmission shaft 22 linked to the engine 7 is rotatably provided through a bearing 23 inside the gear casing 14. A first bevel gear 24 is fixedly fitted to the front end (the left end in FIG. 3) of the transmission shaft 22. An intermediate shaft 25 is provided in the gear casing 14 rotatably through a bearing 26 and a bearing 27. A second bevel gear 28 which engages the first bevel gear 24 is fitted to the intermediate shaft 25. A small gear 29 is fixedly fitted to the intermediate shaft 25. To prevent overloading of the engine 7, the inner diameter of a bore 28a of the second bevel gear 28 is substantially identical to the diameter of the intermediate shaft 25, and the intermediate shaft 25 is tightly pressed into the bore 28a of the bevel gear 28. Accordingly, when a hard object such as a stone or the like is interposed between the teeth 17, 18 of the first and second cutting disks 15, 16, a torque exceeding the frictional force is applied to bore portion of the second bevel gear 28 and the second bevel gear 28 slips to run idle.

Inside the gear casing 14 a boss shaft 30 is provided rotatably through a bearing 31, and a large gear 32 which engages the small gear 29 is fixedly fitted to the boss shaft 30. A sun gear 33 is integrally provided at the lower end of the boss shaft 30, and, as shown in FIG. 4, a pair of planet gears 34, 35 which engage the sun gear 33 are positioned symmetrically with respect to the boss shaft 30. A ring-shaped internal gear 36 which engages the planet gears 34, 35 is provided on the inner surface of the gear casing 14 by a bolt 37. The planet gears 34, 35 orbit the periphery of the sun gear 33 according to the rotation of the sun gear 33. A cam shaft 38 is integrally provided in the planet gear 34, the rotating motion of the engine 7 is converted to rotating motion of the planet gear 34 and orbital motion at the periphery of the sun gear 33 in the planet gear 34, and these motions are transmitted to the cam shaft 38.

The cam shaft 38 which is provided in the planet gear 34 is supported rotatably at its upper end by a first rotary plate 39 and at its lower end by a second rotary plate 40. A main shaft 42 is coaxially and rotatably provided at the bore portion of the boss shaft 30 through a bearing 41. The cam shaft 38 is positioned parallel to the main shaft 42. The first cutting disk 15 is fixed to the lower end of the main shaft 42 by a bolt 43. A tubular shaft 44 is coaxially and slidably fitted rotatably on the outer periphery of the main shaft 42. The second cutting disk 16 is integrally fixed to the lower end of the tubular shaft 44 by a bolt 45 so that the first cutting disk 15 and the second cutting disk 16 are superposed. The tubular shaft 44 is provided rotatably on the gear casing 14 through a bearing 46. The first rotary plate 39 which supports the cam shaft 38 rotatably is provided rotatably on the boss shaft 30 through a bearing 47. The second rotary plate 40 is provided rotatably on the outer periphery of the tubular shaft 44 through a bearing 48. A first circular eccentric cam plate 49 and a second circular eccentric cam plate 50 are integrally provided to the cam shaft 38 to rotate eccentrically, symmetrically centered around the cam shaft 38, as shown in FIG. 5. A first arm 52 having a U-shaped concave portion 51 receives the first eccentric cam 49 in the concave portion 51 and the base portion of the first arm 52 is axially slidably fitted to the main shaft 42 with a spline 53. A second arm 55 having a U-shaped concave portion 54 receives the second eccentric cam plate 50 in the concave portion 54 and the base of the second arm 55 is fixedly coupled to the tubular shaft 44 with a spline 56. The first and second cam plates 49, 50 are radially symmetrically positioned on the cam shaft 38 so that when the cam shaft 38 rotates, the first and second arms 52, 55 pivotably oscillate in opposite directions. Therefore, the rotating motion of the cam shaft 38 is converted to oscillating motion in the first and second arms 52, 55.

As a result, when the sun gear 33 rotates in the direction indicated by an arrow A, as shown in FIG. 4, the planet gear 34 orbits the periphery of the sun gear 33 in the direction indicated by an arrow B, while also rotating in the direction indicated by an arrow C. Accordingly, as shown in FIG. 5, the first and second arms 52, 55 rotate around the main shaft 42 and the tubular shaft 44 while pivotably oscillating in opposite directions relative to each other. For this reason, the cutting disks 15, 16 which are fixed to the main shaft 42 and the tubular shaft 44, rotate in the direction indicated by an arrow E while also oscillating in opposite directions relative to each other.

On a shaft 57 which is provided in the planet gear 35, a balancer 58 is provided in a symmetrical position centered around the main shaft 42. The shaft 57 is supported rotatably on the first and second rotary plates 39, 40 in the same way as the cam shaft 38.

Furthermore, a snap ring 59 is mounted on the main shaft 44, and a biasing means is disposed between the snap ring 59 and the first arm 52. In this embodiment of the present invention, an elastic body 60 such as a disc spring is used as the biasing means. This biasing means biases the main shaft 42 axially in the upward direction in FIG. 3 to press the first cutting disk 15 toward the second cutting disk 16. Because the first and second cutting disks 15, 16 are bent slightly inward toward each other so that the superposed teeth 17, 18 are pressed together only at the tip portion from elastic contact, adequate cutting pressure is produced between the teeth of the first and second cutting disks 15, 16 by the biasing means. Superior cutting force is provided at the teeth from the pressure between the disks so that it is unnecessary to provide sharp cutting edges at the outer peripheral edges 21 of the cutting disks.

A detailed operational description of this embodiment will now be given based on the structure described above.

When the engine 7 is driven and the transmission shaft 22 rotates, the boss shaft 30 is rotated through the first bevel gear 24, the second bevel gear 28, the small gear 29, and the large gear 32. In this manner, as shown in FIG. 4, when the sun gear 33 rotates in the direction A according to the rotation of the boss shaft 30, the planet gears 34, 35 orbit in the direction B, that is, the same direction as the sun gear 33, while rotating in the direction C, that is, the opposite direction to the sun gear 33. Accordingly, as shown in FIG. 5, the first and second eccentric cam plates 49, 50, which are positioned symmetrically in relation to the cam shaft 38 of the planet gear 34, orbit in the direction E, the same direction as the sun gear 33, while also rotating in the direction D. Accordingly, the first and second arms 52, 55, along with the rotation of the first and second eccentric cam plates 49, 50, orbit in the direction E while reciprocatively oscillating in relatively opposite directions relative to each other. Therefore, the first and second cutting disks 15, 16 which are integrally provided on the first and second arms 52, 55 through the main shaft 42 and the tubular shaft 44, orbit in the direction E while reciprocatively oscillating in relatively opposite directions to each other.

To utilize the action of the first and second cutting disks 15, 16 as described above, the operator simply holds the grips 11 of the handle 10 and pushes the lawn mower forward. It is possible to cut the grasses which protrude from the side of a hedge or the like with the teeth 17, 18 of the first and second cutting disks 15, 16. Also, the fact that the first and second cutting disks 15, 16 are orbiting helps to move the lawn mower 1 forward, making the operator's job easier. Because the first and second cutting disks 15, 16 are orbiting, the teeth 17, 18 around the full periphery of each disk respectively are utilized uniformly and therefore these teeth wear uniformly, thus extending the effective life span of the first and second cutting disks 15, 16.

In this embodiment, the inner diameter of the bore 28a of the bevel gear 28 and the diameter of the intermediate shaft 25 are substantially identical. By pressing the intermediate shaft 25 tightly into the bore of the bevel gear 28 so that it can be pressure-fitted to the bevel gear 28, when a torque overload is encountered which exceeds the frictional force on the bore portion of the second bevel gear 28, the bevel gear 28 slips and runs idle, whereby the transmission of motive power from the transmission shaft 22 to the intermediate shaft 25 is interrupted. Accordingly, when a hard object such as a stone or the like is interposed between the teeth 17, 18 of the first and second cutting disks 15, 16, breakage from wear and tear on the power transmission parts such as the first and second cutting disks 15, 16 and the gears and the like, which is caused by shock, can be avoided.

This embodiment of the present invention has an configuration whereby the first and second cutting disks 15, 16 are provided on the gear casing 14, parallel to the front wheel 4 and the rear wheels 3, but it is also possible to provide a configuration whereby the first and second cutting disks 15, 16 are supported horizontally.

Moreover, the apparatus of the present invention can also be used as an attachment for a construction machine or an industrial machine.

It must be understood that the invention is in no way limited to the above embodiments and that many changes may be brought about therein without departing from the scope of the invention as defined by the appended claims.

What is claimed is:

1. A mowing apparatus, comprising;
   a motive power source for supplying rotating motion;
   a pair of first and second cutting disks slidably supported with respect to each other, each of said disks including a plurality of peripheral cutting teeth;
   means for reciprocatively oscillating said first and second cutting disks in opposite directions relative to each other within a predetermined oscillating range by the rotating motion of said motive power source; and
   means for rotating said first and second cutting disks in one direction while said first and second cutting disks are oscillated reciprocatively by said reciprocatively oscillating means, said rotating means also being driven by the rotating motion of said motive power source through said reciprocatively oscillating means.

2. The mowing apparatus of claim 1, wherein said reciprocatively oscillating means comprises:
   a first shaft coupled to said first cutting disk;
   a tubular second shaft into which said first shaft is rotatably and coaxially inserted, said tubular second shaft coupled to said second cutting disk; and
   means for converting the rotating motion from said motive power source into oppositely and reciprocatively rotating motions of said first and second shafts within the predetermined angle in opposite directions, said converting means being provided on said first and second shafts.

3. The mowing apparatus of claim 2, wherein the mowing apparatus comprises a casing incorporating said reciprocatively oscillating means and said rotating means, in which said rotating means comprises:
   a sun gear with a rotatable shaft so that said sun gear is rotated by the rotating motion from said motive power source;
   a ring-shaped internal gear provided inside of said casing and coaxially with said sun gear; and
   at least one planet gear which engages said sun gear and said internal gear, said planet gear orbiting the periphery of said sun gear while rotating in accordance with the rotation of the sun gear, whereby driving said converting means by the rotating motion of said planet gear, and rotating said first and second shafts by means of the orbiting motion of said planet gear.

4. The mowing apparatus of claim 3, wherein said converting means comprises:
   a cam shaft fitted to said planet gear, said cam shaft orbiting the periphery of said sun gear while rotating according to the rotation of said sun gear;
   first and second eccentric cam plates eccentrically fixed to said cam shaft so as to be radially symmetrical with each other with respect to a central axis of said cam shaft; and
   first and second arms each having opposite ends, a concave portion being formed at one end of each of said first and second arms, and the other ends of said first and second arms being coupled to said first and second shafts, respectively, each said concave portion of said first and second arms being adapted to receive each of said first and second cam plates, respectively, in such a manner that said first and second arms can be pivotably oscillated in relatively opposite directions with respect to each other in accordance with the rotation of said first and second cam plates, whereby said first and second cutting disks are reciprocatively rotated relative to each other in relatively opposite directions about an axis of said first and second shafts through the predetermined angle.

5. The mowing apparatus of claim 3, wherein the apparatus comprises a body on which said casing and said motive power source are provided and wheels are provided for supporting the body, said first and second cutting disks are rotatably mounted to said body substantially perpendicular to the ground and substantially parallel to the direction of advance of the apparatus.

6. The mowing apparatus of claim, 2 further comprising means for biasing one of said first and second cutting disks toward the other one of said first and second cutting disks.

7. The mowing apparatus of claim 6, wherein said biasing means comprises a spring for biasing said first shaft against said second shaft in the axial direction of said shafts in such a manner that said first and second cutting disks are pressed together.

8. The mowing apparatus of claim 1, further comprising means for interrupting transmission of the rotating motion from said motive power source to said reciprocatively oscillating means when the rotating motion of said cutting disks is suddenly stopped by catching a hard substance between the cutting teeth of said first and second cutting disks to produce an excessive torque.

* * * * *